March 22, 1932. W. C. ANDERSON 1,850,123
CEREAL TREATMENT PROCESS
Filed Feb. 26, 1929
FIG_1_
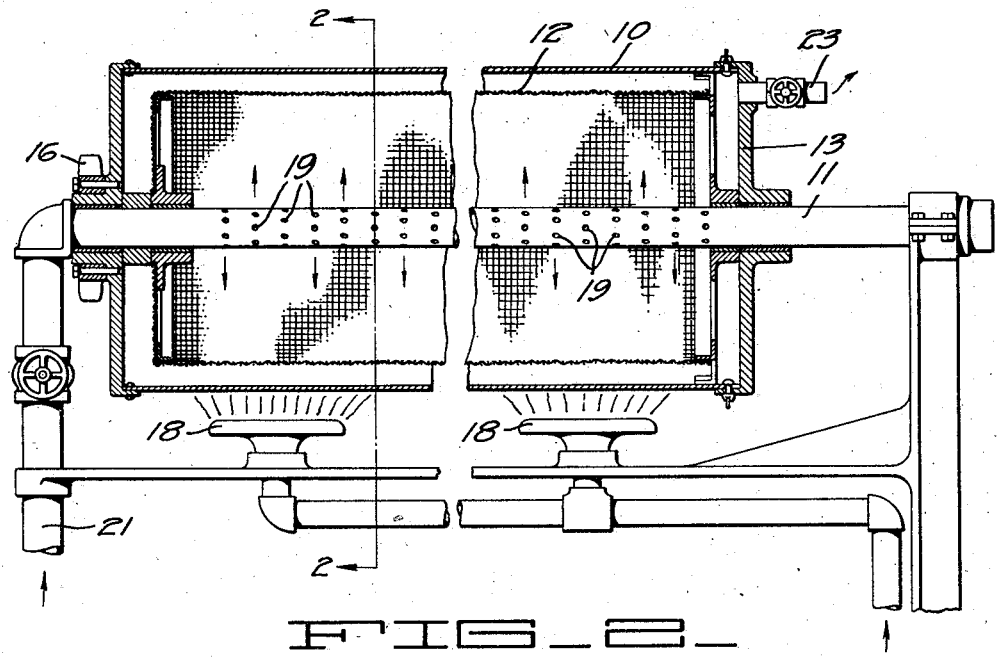
FIG_2_
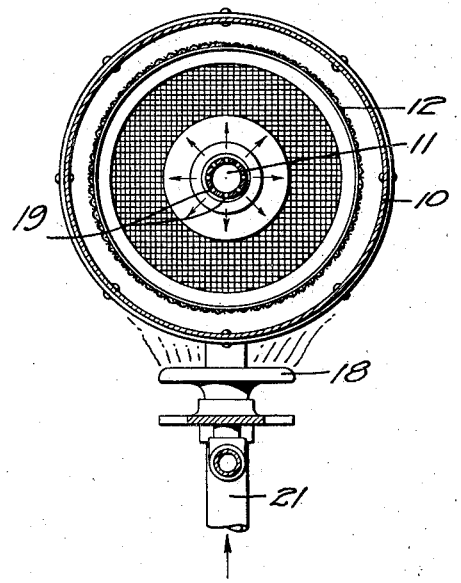
INVENTOR
William C. Anderson
BY
White, Prost & Fryer
ATTORNEYS Patented Mar. 22, 1932

1,850,123

UNITED STATES PATENT OFFICE

WILLIAM C. ANDERSON, OF SAN FRANCISCO, CALIFORNIA, ASSIGNOR OF ONE-HALF TO M. CLINTON MASON, OF ROSS, CALIFORNIA

CEREAL TREATMENT PROCESS

Application filed February 26, 1929. Serial No. 342,811.

This invention relates generally to processes of treating cereal material for preserving the same, and to products resulting from such processes.

It is a general object of this invention to devise a process of preserving cereal material without cooking or roasting and which will obviate the necessity of utilizing chemical of any kind, other than constituents of the cereal itself.

It is a further object of this invention to devise a preserving process applicable to cereal material, which will not depreciate but will retain the food value of the finished product.

It is a further object of this invention to devise new and useful food products resulting from the use of my novel treatment.

Further objects of the invention will appear from the following description in which I have set forth the preferred embodiment of my invention. It is to be understood that the appended claim is to be accorded a range of equivalents consistent with the state of the prior art.

Referring to the drawings:

Figure 1 is a side elevational view partly in cross section, illustrating suitable apparatus which can be used in carrying out my process.

Fig. 2 is a cross sectional view taken along the line 2—2 of Fig. 1.

Many cereal materials, such as rice or rice products, cannot be kept in their natural uncooked state for long periods without spoiling. This spoilage is due largely to rancidity and to the propagation of mold spores, commonly known as mildew. Consequently in the past the marketing of material of this character has been seriously handicapped. While preservation to a certain degree can be secured by the use of certain chemicals, processes of this character are impractical due to the fact that chemical remains in the finished product, thus impairing its nutriment value and salability. The process of this invention is characterized by the fact that the finished product contains no chemical or foreign deleterious material of any kind, and it can be kept over long periods without formation of mildew, and without becoming rancid.

One of the features of my invention is the use of vapor carrying a fermenting agent or enzyme obtained from the cereal material itself. While the material is being subjected to this vapor, it is maintained at a temperature at which the fermenting agent is evolved and becomes active. Subsequently the material is stabilized or substantially sterilized, preferably by heating to an elevated temperature.

In practice I prefer to carry out my process in a suitable sealed container. An apparatus which can be used with good results is shown in the drawings. It consists in this instance of a cylindrical drum 10 carried by a hollow shaft 11. Positioned within the drum 10 and also rotatable about shaft 11, there is a second drum 12 made of screening or foraminous material. Removable cover plate 13 serves as a closure for one end of drum 10, and also as a closure of the corresponding end of drum 12. For rotating the drums I have indicated suitable mechanical means such as a sprocket 16. For heating drums 10 and 12 and their contents to any desired temperature, I have shown fuel burners 18. Preferably shaft 11 within drum 12 is provided with a plurality of perforations 19, and one projecting end of shaft 11 is in communication with a pipe 21, this pipe connecting to a suitable source of compressed air. Drum 10 can be placed in communication with the atmosphere, thru a suitable valve 23.

The preferred manner of carrying out my process can be best understood by explaining the manner in which the above described apparatus can be employed. A certain amount of cereal material, as for example unmilled rice kernels, from which the hulls have been removed, are introduced into the drum 12 while the closure 13 is removed. Cover 13 is then clamped in place and drum 10 substantially sealed. I then commence to heat the drum by flames from burner 18, while the drum is being rotated. Rotation of the drum serves to keep the rice kernels agitated and to effect uniform treatment. I prefer to supply sufficient heat so that the drums 10 and 12 and the rice kernels are heated to a temperature of about 120 deg. F., thru a relatively short period of say 20 minutes. At this temperature vapor is evolved from the rice kernels, and this vapor carries an active fermenting agent or enzyme from the rice kernels themselves. Due to the continuous agitation, the external surfaces of the rice kernels are thoroughly subjected to this fermenting vapor, and a certain fermenting action takes place. While this fermenting action may produce a number of important results not clearly understood, I have observed that it serves to convert the starch in the outer coating of the kernels to the sugar maltose.

Rather than to maintain the rice kernels at a given temperature at which the vapor is active as a fermenting medium I prefer to gradually increase the temperature over a substantial period of time from about 120 deg. F. to a temperature in excess of 150 deg. F. and preferably as high as 160 or 165 deg. F. Thus in practice I prefer to gradually increase the temperature of the rice kernels from 120 deg. F. to about 165 deg. F. over a time period of about 25 or 30 minutes, while the kernels are continuously agitated. At the lower temperature the fermenting action takes place, while at temperatures near 150 deg. and above, the fermenting agent is suppressed and the material is stabilized.

During the above treatment, another important action takes place which prevents the finished product from becoming rancid. This rancidity is due to disintegration of fat globules contained in the outer integuments of the rice kernel. In my process, during treatment of the rice kernels in the enclosed container, the fat globules in the outer integuments of the rice kernels are broken up in such a manner that the completed or finished product does not contain fat in such form that rancidity will develop over a comparatively long period. In other words when the fat globules are broken up in this manner, development of rancidity and fatty acids is prevented or minimized to a substantial degree.

After the treatment as specified above, the rice kernels are cooled again to normal temperature, preferably without permitting condensation of the surrounding vapors upon the rice. This is effected in my apparatus by introducing compressed air into the hollow shaft 11 thru pipe 21, at the end of the treatment, and after valve 23 has been opened. Rotation of drum 12 is continued during this time. Jets of air from openings 19 blow thru the mass of rice kernels, effectively removing entrained vapor and discharging such vapor thru valve 23. At the same time the rice kernels are cooled to normal temperature. Following this operation the material can be removed by opening closure 13, and is then in condition for storage or for packing in cartons for the market.

My treatment process is capable of producing many novel food products. One such product results when unmilled rice kernels, from which the hulls have been removed, are treated with my process. These kernels before they are treated by my process are in natural uncooked condition, and generally a certain number of kernels have a greenish color showing that they have not been completely ripened. After such kernels have been treated by my process, the greenish color disappears and the kernels have a substantially unbroken coating which is brownish in color and which consists chiefly of sugar maltose. When such treated rice kernels are cooked, they have a pleasing nutty flavor characteristically different from ordinary rice kernels. I attribute this in part to the accelerated ripening effect of my process and also probably due to the presence of the sugar maltose. It is well known that unmilled rice kernels are of high food value, due largely to certain ingredients in the outer coating. When treated by my process the food value of the unmilled rice kernels is largely retained, so that rice in this form provides a stable food of great value. A certain amount of moisture is removed during my process, say 2% of the weight of the total amount of cereal material treated, but this is not objectionable.

Another novel food product results from treating rice polishings, or mixture of bran and polishings, by my process. By rice polishings I refer to a flour or meal which is ordinarily removed in the preparation of ordinary white milled or polished rice. After treating such material with my process, it is still in the form of a flour, and can be used as a food in various ways.

My process can also be employed for the treatment and preservation of middlings, bran, and other by-products of flour mills. When such treated material is mixed with white wheat flour in proper proportions, it serves to restore the fat, proteins and organic salts milled off the wheat in the manufacture of white flour. The resulting blended flour has all the nutriment value of whole wheat flour, and will keep for long periods without spoilage.

Other cereal materials which can be treated by my process and which are ordinarily difficult to keep without spoiling are soy beans and soy bean flour. After this flour has been subjected to my process it will keep over relatively long periods. The soy bean material undergoes a ripening effect and becomes a palatable food without the necessity of masking the natural unpleasant soy bean taste, by the addition of flavorings or other such substances. When used in cooking various foods, it imparts a sweet and nutty flavor.

I claim:

The process of treating natural cereal material containing starch which comprises initially heating the material in contact with vapors evolved from the material so that the temperature of the material is raised to about 120 degrees Fahrenheit in about twenty minutes time, secondly heating the material from about 120 degrees Fahrenheit to about 160 degrees Fahrenheit in about twenty-five minutes time, and finally cooling the material out of contact with said vapors by blowing relatively cool air through said material.

In testimony whereof, I have hereunto set my hand.

WILLIAM C. ANDERSON.